March 3, 1931. C. M. NEVIUS 1,794,639
COFFEE BREWING DEVICE
Filed June 24, 1927
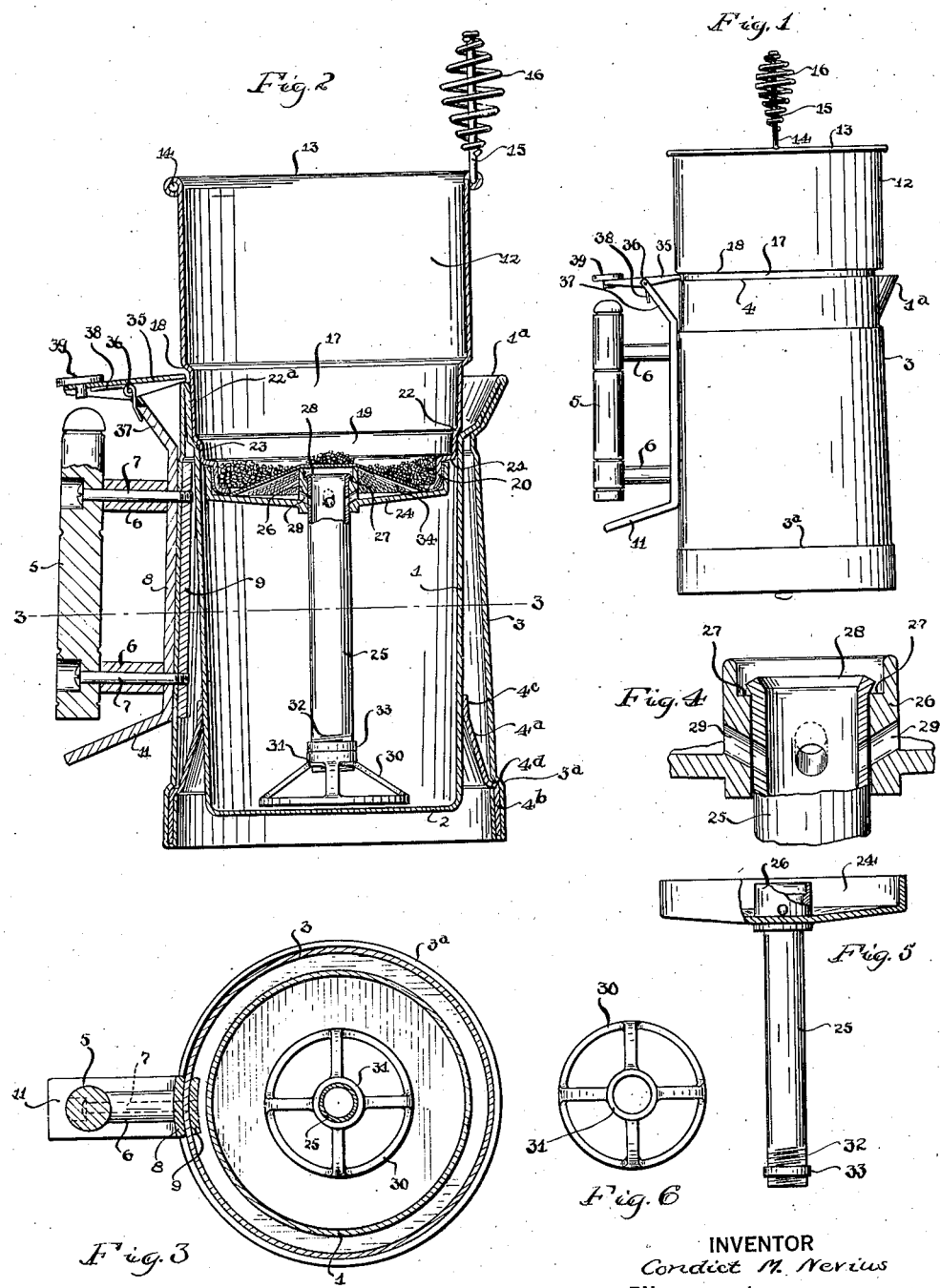

Patented Mar. 3, 1931

1,794,639

UNITED STATES PATENT OFFICE

CONDICT M. NEVIUS, OF HORNELL, NEW YORK, ASSIGNOR TO C. M. NEVIUS, INC., OF HORNELL, NEW YORK

COFFEE-BREWING DEVICE

Application filed June 24, 1927. Serial No. 201,216.

The present invention relates to coffee brewing devices and more particularly to the type in which the ground coffee is held in a compartment above a water compartment and hot water is forced through a liquid conductor into the coffee compartment by the steam generated from the water in the water compartment.

An object of this invention is to provide a construction in which the coffee receptacle has a bottom removably secured thereto and serving to hold a strainer in position thereon, provision being made on the liquid conductor for preventing the bottom being separated from the coffee receptacle due to the creation of a vacuum in the liquid receptacle. Another object of the invention is to provide a stop on a liquid conductor supported by a removable bottom on the coffee receptacle, a stop which acts to prevent the removable bottom being displaced from the coffee receptacle by outside pressure due to a partial vacuum created in the liquid receptacle below the coffee receptacle. Another object of the invention is to provide for the adjustment of the stop on the coffee receptacle to take up for wear in the seal between the coffee receptacle and the liquid receptacle.

Another object of the invention is to provide a coffee receptacle with a strainer which declines from its center so that the ground coffee will work toward the outer edge of the strainer and leave a substantially clear space on the strainer through which the liquid may readily flow. Still another object of the invention is to provide in a brewing device of the type described a strainer which is held spaced from the bottom of the coffee receptacle by the upper end of the liquid conductor so that the liquid may flow from the coffee receptacle to the liquid conductor by way of ports in the latter above the bottom of the coffee receptacle and below the upper end of the liquid conductor. A further object of the invention is to provide a mechanical means for breaking the seal between the coffee receptacle and the liquid receptacle.

To these and other ends, the invention consists of certain parts and combinations of parts all of which will be hereinafter described: the novel features being pointed out in the appended claims.

In the drawings:

Fig. 1 is the side view of a coffee brewing device constructed in accordance with this invention;

Fig. 2 is a vertical section through the coffee brewing device;

Fig. 3 is a horizontal section on the line 3—3, Fig. 2;

Fig. 4 is a fragmentary enlarged section showing the connection between the bottom of the coffee receptacle and the liquid conductor tube;

Fig. 5 is a partial section of the bottom member of the coffee receptacle showing the conductor tube connected therewith; and Fig. 6 is a plan view of the adjustable stop on the lower end of the conductor tube.

In the illustrated embodiment of the invention there is employed a liquid receptacle comprising an inner wall 1 provided with a bottom 2 and spaced from an outer wall 3, the inner wall 1, the bottom 2 and the outer wall 3 being formed from one piece of sheet metal, the inner wall connecting with the outer wall 3 by a bend 4 at its upper edge and both walls being bent outwardly at $1^a$ to provide a pour spout. In order to close the space between the inner wall 1 and the outer wall 3 a closure ring is provided which has a tapered center portion $4^a$, a cylindrical outer portion $4^b$ and a cylindrical inner portion $4^c$ of less diameter than the cylindrical outer portion $4^b$ due to the tapered portion $4^a$ between them. The tapered portion $4^a$ connects with the cylindrical portion $4^b$ by a shoulder $4^d$, and this shoulder is adapted to abut a shoulder $3^a$ formed between the upper portion of the outer wall 3 and the lower portion. The inner wall 1 has a slight external taper so that, about the time the shoulder $4^b$ on the ring or closure abuts the shoulder $3^a$, a tight fitting engagement is established between the portion $4^c$ of the ring and the outer face of the tapered inner wall 1. The ring or closure is held in position by turning the lower edge of the outer wall inwardly at $3^b$ about the bottom edge of the ring and at a point below the bottom 2.

A handle of novel construction may be secured to the liquid holder and may comprise a grip portion 5, two tubular supporting posts 6, and bolts 7 pass through the grip portion and the supporting posts and also through an abutment plate 8 against which the inner ends of the posts rest, said plate abutting the outer wall 3 of the liquid receptacle opposite an anchoring plate 9 which lies between the inner wall 1 and the outer wall 3 and has the bolts 7 anchored therein. This arrangement provides an effective manner of securing the handle to the receptacle. The abutting plate 8 may have its lower end turned outwardly at 11 beneath the lower end of the grip and the tubular posts 6, thus protecting this part of the handle against the action of flame.

The coffee receptacle preferably embodies a main body portion 12 having a rolled bead 13 at its upper edge in which is received a reinforcing wire 14 which is extended through the bead 13 to provide a vertical portion 15 projecting upwardly above the bead and surrounded by a wire grip 16 through which the coffee receptacle may be fitted to or removed from the liquid receptacle. The body 12 has a slightly tapering reduced portion 17 connecting to the main portion by a shoulder 18. Below this reduced portion 17 is a still further reduced portion 19 also slightly tapered with a shoulder 22 between them, and below the portion 19 is a reduced portion 20 of a slightly tapering form connecting with the portion 19 by a shoulder 21. The portion 17 fits within a flaring portion 22ª at the upper end of the liquid receptacle with the shoulder 18 in spaced relation to the upper edge of the liquid receptacle and the shoulder 22 between the portions 17 and 19 in abutment with the shoulder 23 on the interior of the liquid receptacle. The shoulder 22 connects with the portion 19 on a greater radius than the lower portion of the inner wall 1 connects with the shoulder 23, so that the coffee receptacle can wedge itself in the liquid receptacle to form a tight sealed joint between the two receptacles at this point. The bottom of the coffee receptacle is formed separately from the side wall and, in this instance, is in the form of a cupped shaped member 24 adapted to fit upon the flaring portion 20.

To the bottom member 24 is secured a liquid conductor tube 25 for directing the hot water from the liquid receptacle into the coffee receptacle and for returning the liquid coffee to the liquid receptacle after the brewing takes place. This tube 25 is effectively secured to the bottom member by providing the bottom member with a central opening and a boss or sleeve 26 projected upwardly and also slightly downwardly about the opening. This sleeve has an internal shoulder 27 and slight upwardly tapering inner walls below the shoulder. The tube 25 is forced into the sleeve or boss to make a tight fit with the tapered walls and the upper end 28 of the tube is then turned outwardly above the shoulder to hold the tube to the bottom member 24. The bottom member 24 tapers downwardly toward the central opening, and bores or ports 29 lead through the sleeve 26 and the tube 25 in a downward direction in order to drain the bottom of the coffee receptacle through the tube 25.

On the lower end of the tube is provided a stop or abutment member 30 in the form of a spider for cooperating with the bottom 2 of the liquid receptacle for a purpose which will be hereinafter described. This abutment is adjustably connected to the tube 25 by having an internally threaded ring 31 at its upper end engaging screw threads on the lower end of the tube 25. The abutment is held in its adjusted position by a lock ring 33 also adjustable on the screw threads 32 above the ring 31. This stop or abutment permits the use of a gradual taper in the seal as it can be so adjusted that it provides for proper cooperation between the parts.

A strainer cloth 34 is held at its edges between the inner face of the flange of the bottom member 24 and the outer face of the reduced portion 20. This strainer cloth is held off the bottom 24 at its center by the outlet end of the liquid conductor formed by the upper end of the sleeve 26 and the tube 25. This tent or cone shaped formation of the strainer tends to direct the ground coffee to the outer lower edge of the strainer and in this way maintains a clear or substantially clear portion on the strainer.

For separating the upper coffee receptacle from the lower liquid receptacle, a separator is provided comprising, in this instance, a lever 35 pivoted between its ends at 36 to an outward extension 37 on the abutment plate 8. The inner end of this lever is normally held by a spring 38 in engagement with the upper edge of the liquid receptacle and it lies, when the upper coffee receptacle is in position on the lower inner receptacle, beneath the shoulder 18 so that, when the outer insulated finger piece end 39 of the lever 35 is depressed, the coffee receptacle will be pushed out of binding or sealing engagement with the lower liquid receptacle and may be removed readily through the hand grip 16.

In using this brewing device, the lower liquid receptacle has placed therein a desired amount of water, and the upper coffee receptacle has placed therein a desired amount of ground coffee. The two receptacles are then fitted together and the apparatus as a whole is then place on the stove or over a suitable burner. When the water boils in the lower liquid receptacle a steam pressure will be created above the water, and this pressure will force the boiling water upwardly through the liquid conductor due to the fact that there is no outlet for the steam or water at any other point. Eventually substantially all of the water will be forced into the coffee receptacle where it will remain as long as heat is applied or as long as may be necessary to complete the infusion. When the heat is removed and the steam condenses the liquid coffee infusion will filter through the ground coffee and return to the lower liquid receptacle by way of the ports 29 and the liquid conductor due to the partial vacuum created. The partial vacuum thus created has a tendency to disconnect the bottom 24 from the body portion of the coffee receptacle, but this is prevented by the stop or abutment 30 which should be so positioned as to engage with the bottom 2 of the liquid receptacle to prevent this action. The pressure created by this vacuum also tends to force the shoulder 22 in firmer engagement with the shoulder 23 and as these parts will eventually wear it is desirable to make the abutment 30 adjustable, so that it may be so positioned that it will not interfere with the forcing of the upper coffee receptacle into the lower liquid receptacle through the pressure induced by the creation of the partial vacuum in the liquid receptacle and yet, at the same time, the bottom member 24 of the upper coffee receptacle will be held in position or against separation from the body of the coffee receptacle. The tent or cone shape of the strainer cloth 34 tends to cause the coffee grounds to work toward the outer side of the strainer cloth except directly over the discharge tube, and in this way the coffee grounds do not materially interfere with the flow of the liquid coffee to the liquid receptacle. The separating lever may be depressed to destroy the sealed and binding engagement between the upper coffee receptacle and the lower liquid receptacle so that the coffee receptacle may be removed readily by means of the hand grip 16.

What I claim as my invention and desire to secure by Letters Patent is:

1. A coffee brewing device comprising a lower liquid receptacle, an upper coffee receptacle fitting in the lower liquid receptacle, a strainer arranged over the bottom of the coffee receptacle, a conductor depending from the bottom of said upper receptacle into the liquid receptacle, and means projecting upwardly from the bottom of the upper coffee receptacle to hold the strainer in spaced relation to said bottom, said means having a passageway below the strainer and leading to the conductor.

2. A coffee brewing device comprising a lower liquid receptacle, having a top opening with an area substantially as large as the general cross sectional area of the receptacle, an upper coffee receptacle having a closed bottom substantially equal in area to the area of the top opening in the receptacle and a sealing fit with the inner wall of the lower liquid receptacle, the walls of the two liquid receptacles being formed at the point of sealing of non-yielding material expansible under heat, and a liquid conductor depending from the closed bottom of the upper receptacle into the lower receptacle in spaced relation to said seal, said conductor having its upper end opening adjacent the bottom of the upper receptacle to drain the liquid contents of the latter into the lower receptacle.

3. A coffee brewing device comprising a lower liquid receptacle, having a top opening with an area substantially as large as the general cross sectional area of the receptacle, and an annular shoulder adjacent the top thereof, an upper coffee receptacle having a closed bottom substantially equal in area to the area of the top opening in the receptacle and an annular external reduced portion adjacent the bottom thereof for cooperating with the annular shoulder on the lower liquid receptacle to provide a sealing fit, the coengaging portions on the two parts being made of non-yielding material expansible under heat, and a liquid conductor depending from the closed bottom of the liquid receptacle into the lower receptacle to expose the bottom of the upper receptacle to the physical conditions of the interior of the lower receptacle, said conductor having its upper end opening adjacent the bottom of the upper receptacle to drain the liquid contents of the latter into the lower receptacle.

4. A coffee brewing device comprising a lower liquid receptacle having a top opening with an area substantially as large as the general cross sectional area of the receptacle, and an annular shoulder in spaced relation to the upper edge of the receptacle, and an upper coffee receptacle having a closed bottom substantially equal in area to the area of the top opening in the receptacle and surrounding annular reduced portion above said bottom, the wall of the upper receptacle being spaced from that portion of the wall of the lower receptacle above the reduced portion to provide an annular chamber for collecting condensed steam passing the sealing portion, and a liquid conductor depending from the closed bottom of the upper receptacle into the lower receptacle to expose the bottom of the upper receptacle to the physical conditions of the interior of the lower receptacle, said liquid conductor having its upper end opening adjacent the bottom of the upper receptacle to drain the liquid contents of the latter into the lower receptacle.

5. A coffee brewing device comprising a lower liquid receptacle, an upper coffee receptacle having a closed bottom and a sealing fit with the lower receptacle, a liquid conductor depending from the closed bottom of the upper receptacle into the lower liquid receptacle to expose the bottom of the upper receptacle to the physical conditions of the interior of the lower receptacle, said conductor projecting into the upper receptacle above the bottom thereof and having openings adjacent the bottom to drain the liquid contents of the upper receptacle into the lower receptacle, and a strainer having its central portion abutting the upper end of the conductor and its edge portion secured in spaced relation about the conductor in a plane below the upper end of the conductor, so that the strainer tends to direct the coffee away from the upper end of the conductor.

6. A coffee brewing device comprising a lower liquid receptacle, an upper coffee receptacle having a closed bottom and a sealing fit with the lower liquid receptacle, a liquid conductor depending from the closed bottom of the upper receptacle into the lower receptacle to expose the bottom of the upper receptacle to the physical conditions of the interior of the lower receptacle, said conductor having its upper end opening adjacent the bottom of the upper receptacle to drain the liquid contents of the latter into the lower receptacle, and a cone shaped strainer having its highest point arranged above the upper end of the conductor and its edges spaced from the conductor.

7. A coffee brewing device comprising a lower liquid receptacle, an upper coffee receptacle having a top opening with an area substantially as large as the general cross sectional area of the receptacle having a sealing fit with the inner wall of the receptacle, a closed removable bottom for the upper coffee receptacle substantially equal in area to the area of the top opening in the receptacle, a strainer held between the closed removable bottom and the main portion of the upper coffee receptacle, and a conductor tube depending from the closed removable bottom into the lower receptacle and having an opening at its upper end below the strainer so that the conductor tube will drain liquid contents of the upper receptacle into the receptacle.

8. A coffee brewing device comprising a lower liquid receptacle, an upper coffee receptacle having a closed bottom and a sealing fit with the lower receptacle, a liquid conductor depending from the closed bottom of the upper receptacle into the lower liquid receptacle and having a portion projecting into the upper receptacle, and a textile strainer having its central portion supported by the upper end of the conductor and its edge portion secured in spaced relation about the conductor in a plane below the upper end of the conductor so that the strainer tends to direct the coffee away from the upper end of the conductor.

9. A coffee brewing device comprising a lower liquid receptacle, an upper coffee receptacle having a closed bottom, a liquid conductor depending from the closed bottom of the upper receptacle into the lower receptacle in spaced relation to the walls of the lower receptacle throughout its length and projecting into the upper receptacle, a textile strainer covering the conductor opening and the bottom wall to form a liquid chamber, and means providing communication with the conductor below the upper opening to drain off the contents of the liquid chamber.

10. A coffee brewing device comprising a lower liquid receptacle having a top opening with an area substantially as large as the general cross sectional area of the receptacle, an upper liquid receptacle having a closed bottom substantially equal in area to the area of the top opening in the receptacle, a liquid conductor depending from the closed bottom of the upper receptacle into the lower receptacle, and cooperating sealing portions on the lower receptacle and the upper receptacle spaced from the liquid conductor to expose the bottom of the upper receptacle to the physical conditions of the interior of the lower receptacle.

11. A coffee brewing device comprising a lower liquid receptacle, an upper coffee receptacle having the exterior face of its sidewall sealing against the inner face of the side wall of the lower liquid receptacle, a strainer closing the bottom of the upper receptacle, a conductor, and an enlarged portion at the upper end of the conductor having a detachable connection with the upper coffee receptacle at a point within that portion of the upper receptacle fitting the inner face of the lower receptacle, said enlarged portion holding the strainer against the bottom of the upper receptacle and supporting the conductor in a depending position with reference to the upper receptacle.

CONDICT M. NEVIUS.